UNITED STATES PATENT OFFICE.

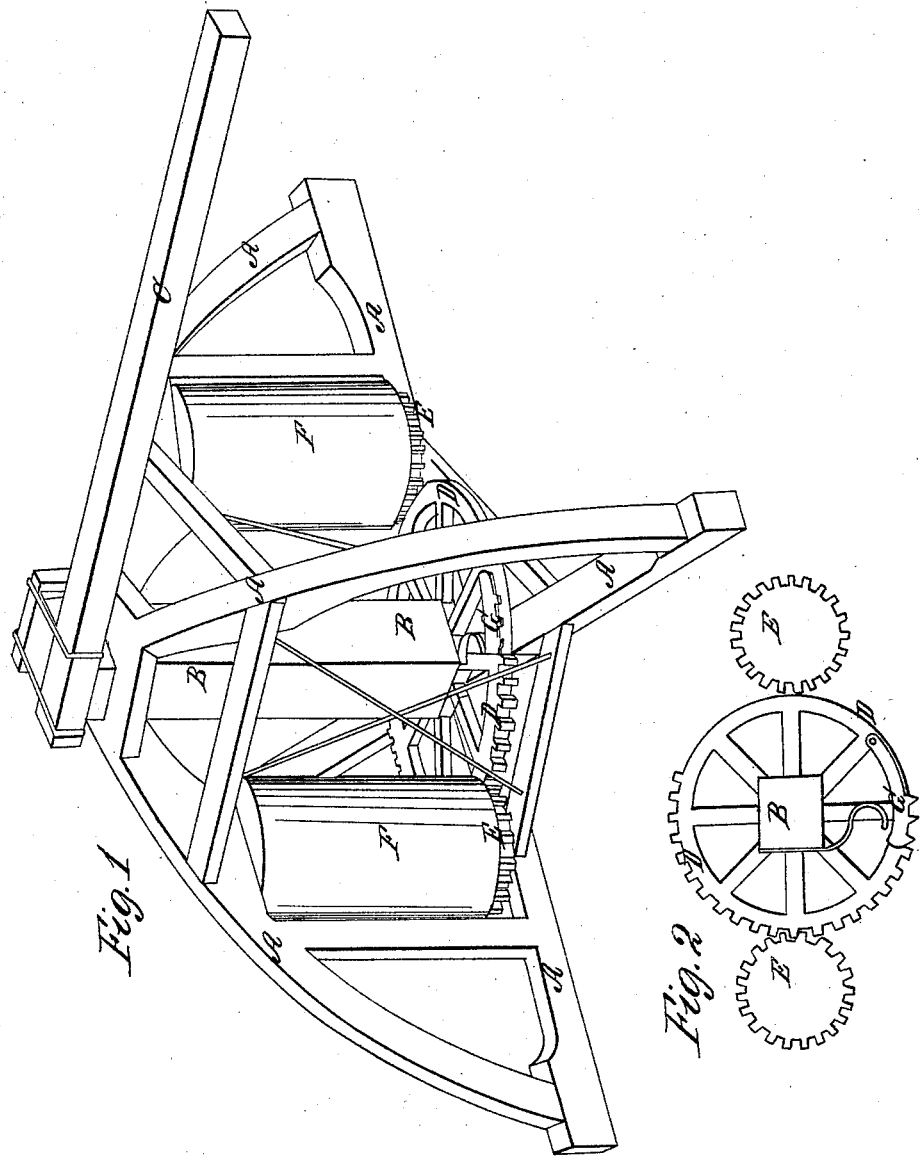

H. C. DREW, OF STOCKBRIDGE, MICHIGAN.

CAPSTAN FOR PLOWS.

Specification of Letters Patent No. 31,446, dated February 19, 1861.

*To all whom it may concern:*

Be it known that I, H. C. DREW, of Stockbridge, in the county of Ingham and State of Michigan, have invented a new and Improved Capstan for Grubbing-Plows, &c.; and I do hereby declare that the following is a full, clear, and exact description thereof, reference being had to the accompany drawings, making a part of this specification, in which—

Figure 1 represents a perspective view of the improved capstan. Fig. 2 is a top view in detail of the cogged gearing used in the capstan.

Similar letters of reference indicate corresponding parts in both figures.

To enable those skilled in the art to fully understand my invention I will proceed to describe its construction and operation.

In the drawings, A, is a framework for supporting the drums with their gearing, which is suitably braced and furnished with means for attaching it securely to the ground at desirable places.

B is a vertical central shaft supported by the case and top part of the frame A, from the upper end of which projects out horizontally a sweep or draft pole C, to which the animals are attached. In operating the machine the animals walk around it and turn the shaft B, on the lower end of which is keyed a large half or three-quarter spurred wheel D, which in its rotation engages alternately with the teeth of the pinion spur wheels E, E, that are on the lower ends of drums F, F, and thus give motion to these drums.

G is a spring rack with three or more teeth, which rack is applied to the circumference of wheel D, for bringing the teeth of the pinion wheels in a proper relation to those on wheel D, before this wheel engages with the pinions.

The ropes or chains to which the grubbers are attached are fixed at their ends to the drums F, F, and in operating the machine the chains are wound up on these drums F; and when the blank portion of the wheel D, comes opposite to the cogs in either pinion E, the drums may be turned freely by drawing on the chain attached to it, thus unwinding the chain from the drum.

The operation of the machine is as follows:—It is staked securely down to the ground in a field to be cleared of its grubs, and the animals are attached to the pole C, and made to walk around the machine. Motion is thus transmitted alternately to the drums F, F, at each half revolution of the wheel D. Each of the chains connected with the drums F, F, is attended by a man; each man hitches the end of his chain, when his drum is loose, to the grubs which are extracted when the teeth on wheel D, engage with those on the drum connected to a grub. In this way the drums act alternately upon their chains which are managed by men who attend to the hitching and unwinding of the chains at the proper times, while the animals continue their walk around the machine.

By placing the animals on the blank side of the wheel D, they will travel over slack rope all the time, as there are no cogs on this side of the wheel, consequently the drum will always be loose nearest the animals.

Having thus described my invention, what I claim as new and desire to secure by Letters Patent, is—

The arrangement of the spring rack G with the blank sided driving gear wheel D, pinions E, E, and drivers F, F, all as herein shown and described for the purpose set forth.

H. C. DREW.

Witnesses:
JOSEPH B. WALLACE,
RACHEL A. WALLACE.